Oct. 31, 1933.    W. J. JOHNSON    1,932,411
MECHANICAL MOVEMENT
Filed Feb. 2, 1932
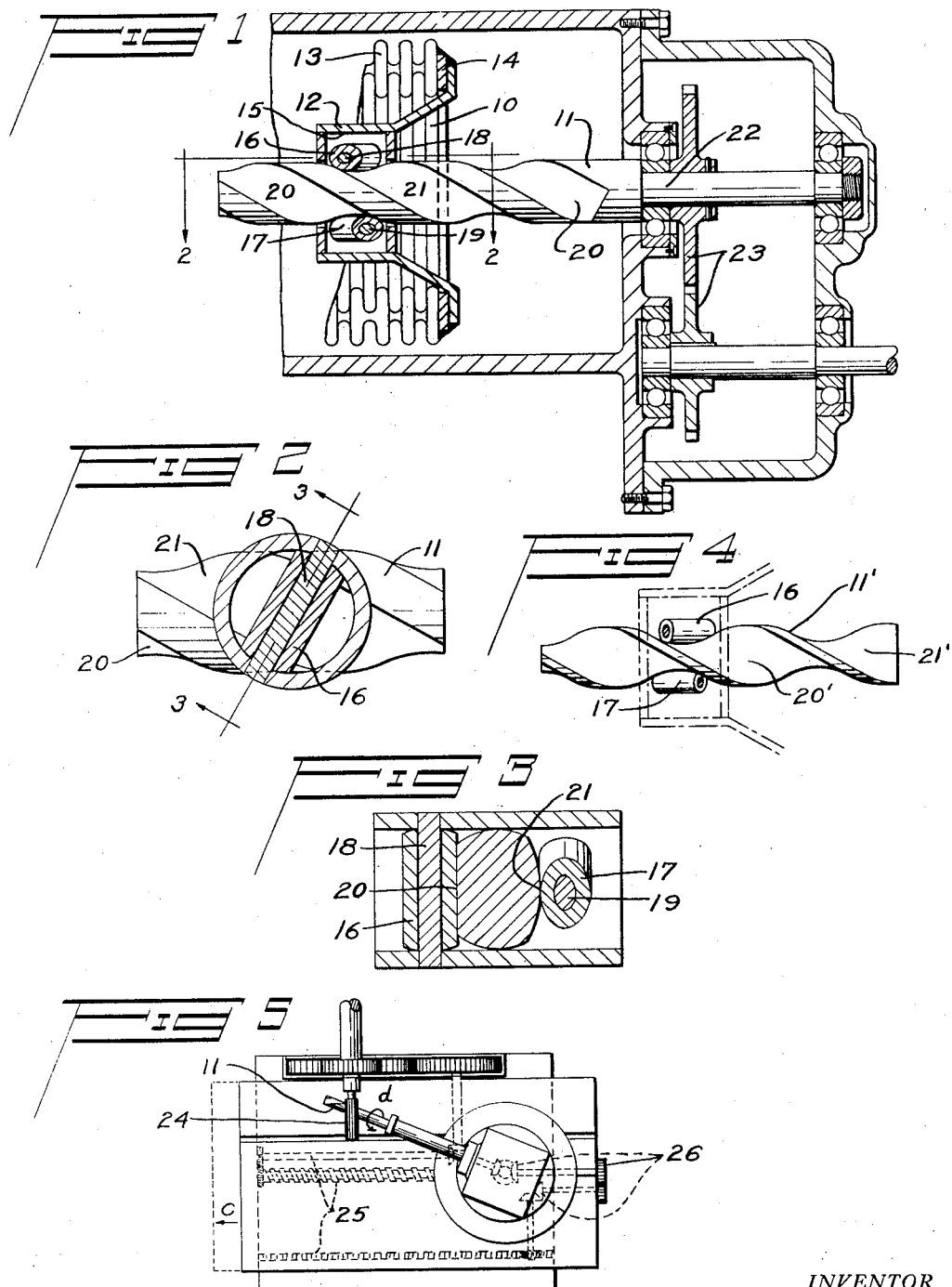
INVENTOR
WILLIAM J. JOHNSON.
BY Francis J. Vanderwerker
and Wade Kontz ATTORNEYS

UNITED STATES PATENT OFFICE 1,932,411

MECHANICAL MOVEMENT

William J. Johnson, Dayton, Ohio

Application February 2, 1932. Serial No. 590,401

18 Claims. (Cl. 74—14)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to a mechanism for transmitting motion and more particularly to a mechanism for imparting mechanical motion which includes a driving member and a driven member by means of which the rectilinear motion of the one member may be transmitted into rotational motion of the other member.

Heretofore in obtaining a mechanical movement of this character, the driven member has usually been in the form of a spindle or shaft having diametrically opposed spiral grooves, the driving member comprising an element having lugs engaged in the spiral grooves of the driven member. A practical illustration of this form of mechanical movement will be found in the ratchet drive mechanism of a conventional automatic screw driver. In order to avoid too great a frictional resistance in a mechanism of this aforementioned character, the grooves in the driven member must be machined with sufficient clearance to permit the lugs of the driving member to operate freely in the said grooves; consequently accuracy to a certain extent is necessarily sacrificed. Also in this type of mechanism referred to, the lugs of the driving member contact against the sides of the grooves and in time the grooves become worn, increasing the lost motion occurring between the driving and driven members and consequently decreasing the mechanical efficiency of this type of mechanism.

The primary object therefore of the present invention is to provide in a mechanism of this character, improved means for obtaining uniform rotary motion from rectilinear motion or vice versa, said means being so constructed that the actual mechanical advantage resulting therefrom resides in the fact that the magnitude of the reacting or developed force received by the driven member, in ratio to the driving or applied force of the driving member, will be more nearly equal. Important desiderata obtained are the rectification and an absorption of torsional and bending stresses which occur during the period of transmission resulting from the movement of the one member relative to the other.

A further object of the present invention is to provide in a mechanism of this character, a driving member and a driven member, which due to their peculiar mechanical connection substantially eliminates the occurrence of lost motion, without introducing any friction, by reducing materially the number of bearing surfaces subject to wear which are inherent in known forms of this general type.

A further object of the present invention is to provide in a device of this character, a driving member and a driven member, one of said members being provided with rollers engaging in spiral raceways formed in the other member so constructed and arranged that pure rolling action of the rollers in respect to their raceways is preserved and the total frictional resistance is materially decreased in comparison with known forms of this general type.

To these and other ends hereinafter set forth, the information stated in general terms comprises a mechanism, one member which when applied to a motor is the driving member of the mechanism is provided as a rotating body having a spiral flat raceway, while the other or driven member is provided as a slide upon which is mounted a roller which rolls on said raceways so that thus upon the rotation of the motor a thrust is imparted to the driven member through the rollers whereby it is given a rectilinear motion; while when the mechanism is applied to a member having rectilinear motion, the rectilinear motion of the slide, being in this case the driving member, effects a rotation of the driven member.

The invention is illustrated by way of example in the accompanying drawing, in which Fig. 1 is a part sectional view of one embodiment of my invention in its simplest form;

Fig. 2 is an enlarged sectional view taken on a line 2—2 of Fig. 1;

Fig. 3 is a sectional view taken on the line 3—3 of Fig. 2;

Fig. 4 is a modified form of construction of the one member of my mechanism; and Fig. 5 is a view showing the set-up necessary in forming the spiral raceways on the one member.

Referring more particularly to the drawing wherein corresponding parts are designated by light numerals throughout the several views thereof, the mechanical motion of the mechanism referred to in the embodiment of my invention herein illustrated, comprises generally a driving member 10 and a driven member 11. The driving member 10, as herein illustrated, comprises a housing 12 to which reciprocating motion may be imparted by means of a pressure operated sylphon 13 shown attached to the flanged end 14 in any suitable manner, as by welding or the like, forming a part of the said housing.

The housing 12 is provided with a longitudinal opening 15 within which opening rollers 16 and 17 are provided which are free to revolve on pins 18 and 19, respectively, fixed to the body portion of the housing 12.

As shown in Fig. 1, the driven member 11 is provided as a cylindrical body having oppositely disposed spiral flats or raceways 20 and 21, which correspond in number to the number of rollers provided on the driving member machined on its sides which same may be cut to any given helix angle in respect to its lead and pitch diameter; the helix angle "$a$" being defined as that taken between the axis of rotation of the driven shaft and a plane tangent to the pitch trace or helix and defined in the following equation, where:—

$d$=pitch diameter
$a$=helix angle
$L$=lead

Then tangent $a = \frac{\pi d}{L}$

As shown in Fig. 1, the end 22 of the driven member 11 may be attached by means of gearing 23 to any suitable mechanism (not shown) adapted for rotational movement.

Attention is directed to Figs. 2 and 3, respectively, wherein it will be observed that the rollers 16 and 17 are mounted with their axes normal to a tangent to the pitch trace or helix. By observing Fig. 3 in particular, it will be observed that the roller 16, which is shown in true cross-section, will make line contact with its raceway 20 when mounted in the position indicated heretofore and pure rolling action of the rollers upon their raceways will be effected. The angle of mounting of the rollers 16 and 17 in respect to their raceways is important in that no other relative positions between the roller and raceway will give the desired result. When the rollers are so mounted a smooth rolling action of the rollers along the respective raceways will be effected and with a tendency toward greater efficiency.

Fig. 4 is a modified form of the invention, in this case the driven member 11' comprising a flat rectangular piece of metal twisted to provide helically wound flat surfaces 20' and 21' corresponding to the spiral flats or raceways 20 and 21 machined on the member 11, as shown in Fig. 1, the hollers 16 and 17 disposed thereon as heretofore described.

In Fig. 5, it will be observed that the driven member 11 is mounted in any suitable milling machine with the axis of rotation of the milling cutter 24 arranged normal to the tangent to the helical trace; driven member 11, as mounted on the milling machine, bed plate being adapted to move forwardly in the direction of the arrow "$c$" shown in Fig. 5. As it moves forward the member 11, through gear systems 25 and 26, is rotated in the direction of the arrow "$d$", the milling cutter 24 cutting a helical flat upon the member 11 in the manner shown. It should, therefore, be clear that a cross-section taken through the driven member 11 on the line 3—3 of Fig. 2 will be bounded by a straight line that lies within the bearing surface of the spiral raceway.

I claim:

1. In a mechanism of the character described, a driving element and a driven element, one of said elements comprising a member provided with a helical bearing surface having a uniform pitch, the other element including a roller adapted to roll in a path which is normal to the tangent of the helical trace of said bearing surface.

2. In a mechanism of the character described, a driving element and a driven element, one of said elements comprising a member provided with a helical bearing surface having a uniform pitch, the other element including a roller adapted to roll on said bearing surface, the axis of rotation of said roller being normal to the tangent of the helical trace of said bearing surface.

3. In a mechanism of the character described, a driving element and a driven element, one of said elements comprising a member provided with a helical bearing surface having a uniform pitch, the other element including a follower so constructed and arranged as to have line contact with said helical bearing surface along a line that is normal to the tangent to the helical trace of said helical bearing surface.

4. In a mechanism of the character described, a driving element and a driven element, one of said elements comprising a member provided with a helical bearing surface having a uniform pitch, the other element including a roller adapted to roll on said bearing surface, the axis of rotation of said roller being arranged normal to the tangent of the helical trace of said helical bearing surface and at an angle to the base line of said helix.

5. In a mechanism of the character described, a driving element and a driven element, one of said elements comprising a member provided with a bearing surface having a helical path, all points on said bearing surface in a section taken normal to the tangent of the helical trace of said bearing surface being in a straight line.

6. In a mechanism of the class described, a driving element and a driven element, one of said elements comprising a member provided with a bearing surface having a helical path, the points on said bearing surface in any section other than a section taken normal to the tangent of the helical trace of said bearing surface forming a curved surface.

7. In a mechanism of the character described, a driving element and a driven element, one of said elements comprising a member provided with a bearing surface having a helical path, the other element including a roller adapted to roll on said bearing surface, the bearing surface of said roller substantially coinciding with the surface of said bearing surface only in a plane normal to the tangent of the helical trace of said bearing surface.

8. As an article of manufacture, a shaft adapted for rotation, said shaft being provided with a bearing surface having a helical path of uniform pitch, said bearing surface being so constructed that a section taken through said shaft at an angle normal to a tangent to the helical trace of said bearing surface will form a straight line.

9. As an article of manufacture, a shaft adapted for rotation, said shaft being provided with a bearing surface having a helical path of uniform pitch, said bearing surface being so constructed that its contour will be a straight line only when a section taken through said shaft is at an angle which is normal to any tangent to the helical trace of said bearing surface.

10. As an article of manufacture, a shaft adapted for rotation, said shaft being provided with a bearing surface having a helical path of uniform pitch, said bearing surface being so constructed that a section taken through said shaft at an angle which is normal to the tangent of the helical trace of said bearing surface will be bounded by a straight line that lies within the bearing surface of said shaft.

11. As an article of manufacture, a member adapted for rectilinear motion, a roller carried by said member, said roller being so arranged relative to said member that horizontal planes passed through the axis of rotation of said roller and the longitudinal axis of said member will be parallel and planes passed through said axes normal to said first-mentioned planes will be angularly disposed.

12. As an article of manufacture, a member adapted for rectilinear motion, said member having an opening longitudinally thereof, a roller disposed within said opening, said roller being so arranged relative to said member that horizontal planes passed through the axis of rotation of said roller and the longitudinal axis of said member will be parallel and planes passed through said axes normal to said first-mentioned planes will be angularly disposed relative to one another.

13. As an article of manufacture, a member adapted for rectilinear motion, a roller carried by said member the axis of rotation of said roller being offset from the longitudinal axis of said member and being so arranged relative to said member that horizontal planes passed through the axis of rotation of said roller and the longitudinal axis of said member will be parallel and planes passed through said axes normal to said first-mentioned planes will be angularly disposed relative to one another.

14. As an article of manufacture, a member adapted for rectilinear motion, said member having an opening longitudinal therethrough a roller disposed in said opening, said roller being arranged in such manner that its bearing surface will be offset from the longitudinal axis of said member and that horizontal planes passed through the axis of rotation of said roller and the longitudinal axis of said member will be parallel and planes passed through said axes normal to said first-mentioned planes will be angularly disposed relative to one another.

15. In a mechanism of the character described, a driving element and a driven element, one of said elements comprising a member provided with a helical bearing surface having a uniform pitch, the other element including a roller so constructed and arranged as to have line rolling contact with said helical bearing surface along a line that is disposed normal to the tangent of the helical trace of said bearing surface.

16. In a mechanism of the character described, a driving element and a driven element, one of said elements comprising a member provided with a helical bearing surface having a uniform pitch, the other element including a follower provided with an arcuate bearing surface having its longitudinal axis disposed normal to the tangent of the helical trace of said helical bearing surface, all sections of the bearing surface of said follower normal to its longitudinal axis and that are in contact with the bearing surface of said first-mentioned element being of a constant diameter struck upon its longitudinal axis to thereby effect line contact between the bearing surface of said follower and said helical bearing surface.

17. In a mechanism of the character described, a driving element and a driven element, one of said elements comprising a member provided with a helical bearing surface having a uniform pitch, the other element including a roller having its axis of rotation disposed normal to the tangent of the helical trace of said helical bearing surface, all sections of the bearing surface of said roller normal to its axis of rotation and that are in contact with said helical bearing surface being of a constant diameter to effect line contact between the bearing surface of said roller and said helical bearing surface.

18. In a mechanism of the character described, a driving element and a driven element, one of said elements comprising a member provided with a helical bearing surface having a uniform pitch, the other element including a cylindrical roller having its axis of rotation disposed normal to the tangent of the helical trace of said helical bearing surface, all sections of the bearing surface of said roller normal to its axis of rotation and that are in contact with said helical bearing surface being of a constant diameter to effect contact between the bearing surface of said roller and said helical bearing surface.

WILLIAM J. JOHNSON.